Jan. 12, 1960     P. H. DAVIDSON     2,921,199
METHOD OF OPERATING A CALUTRON

Filed June 28, 1946     2 Sheets-Sheet 1

INVENTOR.
PHILIP H. DAVIDSON
BY
Robert A. Lavender
ATTORNEY

Jan. 12, 1960 P. H. DAVIDSON 2,921,199
METHOD OF OPERATING A CALUTRON
Filed June 28, 1946 2 Sheets-Sheet 2
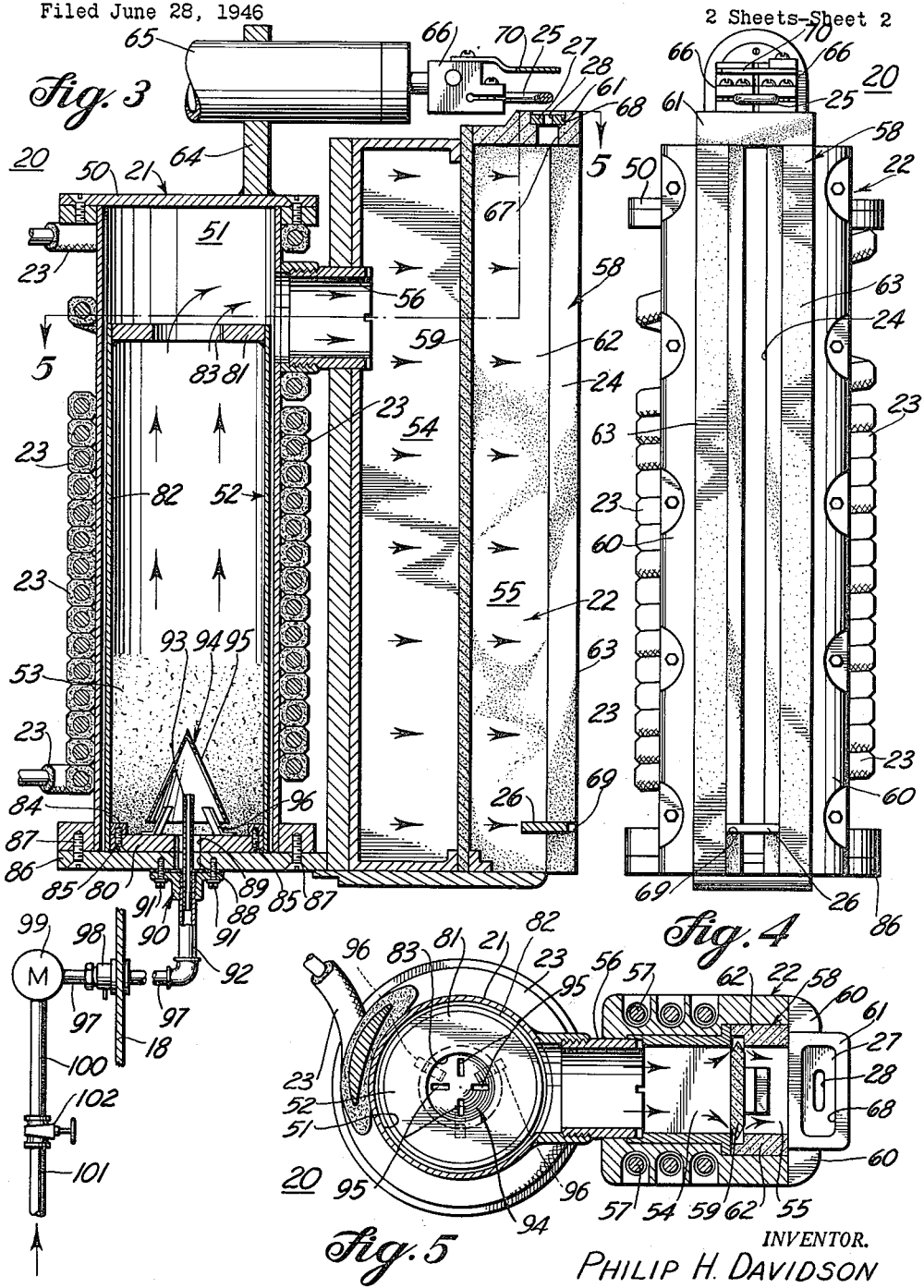
INVENTOR.
PHILIP H. DAVIDSON
BY
Robert A. Lavender
ATTORNEY

United States Patent Office 2,921,199
Patented Jan. 12, 1960

2,921,199

METHOD OF OPERATING A CALUTRON

Philip H. Davidson, Visalia, Calif., assignor to the United States of America as represented by the United States Atomic Energy Commission Application June 28, 1946, Serial No. 679,962

10 Claims. (Cl. 250—41.9)

The present invention relates to calutrons and more particularly to improved apparatus for and methods of operating a calutron ion source unit such that the charge material utilized therein is produced in situ.

It is an object of the invention to improve calutron operation by producing a charge material in situ.

Another object of the invention is to provide an improved calutron process which involves the preparation of uranium halide charge material in situ by reacting a uranium-containing substance and halogen gas.

It is a further object of the invention to provide an improved calutron process involving the preparation of $UCl_4$ charge material by reacting a uranium-containing substance and free chlorine.

It is a further object of the invention to provide an improved calutron process wherein the rate of flow of a vapor charge material into a calutron ionization chamber may be expediently controlled.

It is a further object of the invention to provide an improved calutron process wherein the rate of flow of $UCl_4$ charge material into the ionization chamber of a calutron is controlled by controlling the flow of free chlorine over a uranium-containing substance.

A still further object of the invention is to provide improved calutron apparatus comprising facilities for carrying out the improved method and processes above described.

Figure 1:
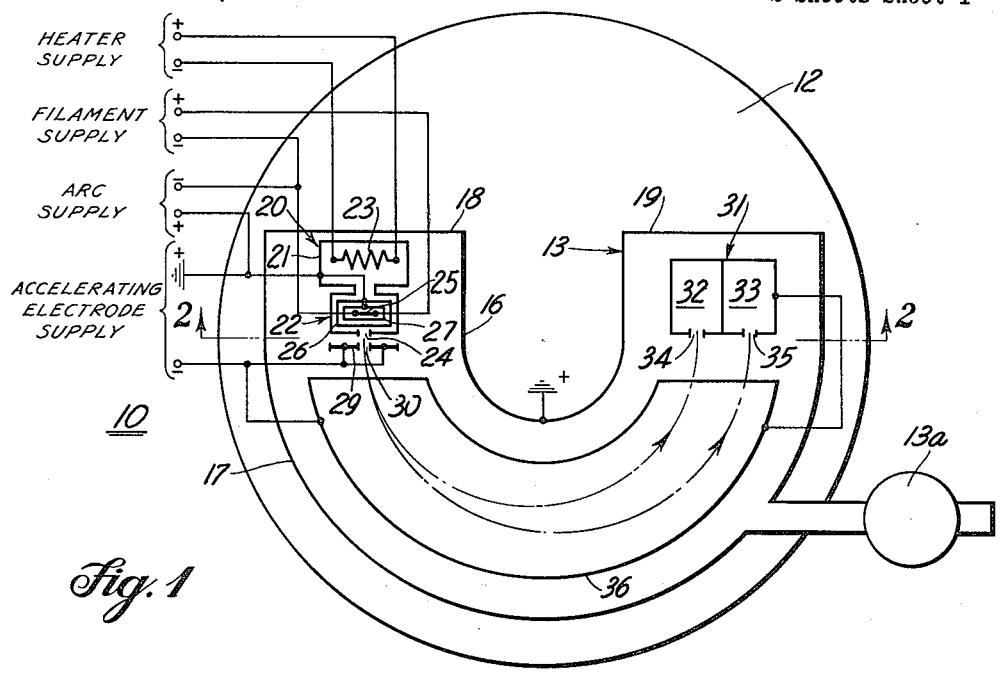
Figure 2:
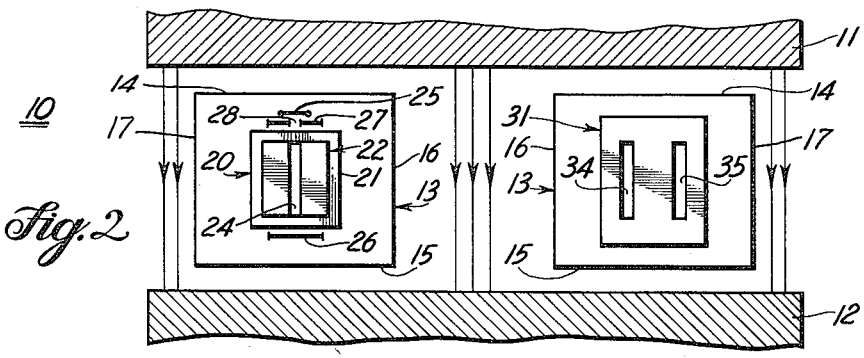
Figure 6:
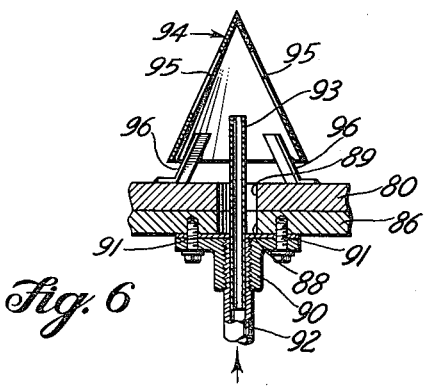

The invention both as to its organization and method of operation together with further objects and advantages thereof will best be understood by reference to the following specification taken in connection with the following drawings, in which Figure 1 is a diagrammatic plan view of a calutron that comprises an ion source unit including a charge receptacle embodying the present invention and in conjunction with which there may be carried out the method of the present invention; Fig. 2 is a diagrammatic sectional view of the calutron taken along the line 2—2 in Fig. 1; Fig. 3 is a longitudinal sectional view of the calutron ion source unit; Fig. 4 is a front elevational view of the source unit shown in Fig. 3; Fig. 5 is a sectional view of the source unit taken along the line 5—5 in Fig. 3; and Fig. 6 is an enlarged fragmentary longitudinal sectional view of the lower portion of the charge receptacle employed in the source unit shown in Fig. 3 and embodying the present invention.

At the outset, it is noted that a "calutron" is a machine of the character of that disclosed in the U.S. Patent No. 2,709,222 entitled "Method of and Apparatus for Separating Materials" issued to Ernest O. Lawrence, May 24, 1955, and is employed to separate the constituent isotopes of an element and, more particularly, to increase the proportion of a selected isotope in an element containing a plurality of isotopes in order to produce the element enriched with the selected isotope. For example, the machine is especially useful in producing uranium enriched with $U^{235}$.

It is not essential that the material initially introduced be a naturally occurring polyisotope, such as naturally occurring uranium. It is feasible to separate any intermixed or intermingled materials capable of producing ions distinguishable from each other by differences in nuclear mass. Since this is true, it is not essential that the initial material mixture be made up necessarily of the same chemical elements, as various different elements in intermixed form can readily be separated.

Such a calutron essentially comprises means for vaporizing a quantity of material containing an element that is to be enriched with a selected one of its isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of the ions being proportional to the square roots of the masses of the ions, whereby the ions are concentrated in accordance with their masses; and means for de-ionizing and collecting the ions of the selected isotope thus concentrated, thereby to produce a deposit of the element enriched with the selected isotope.

Referring now more particularly to Figs. 1 and 2 of the drawings, there is illustrated a representative example of a calutron 10 of the character noted, that comprises magnetic field structure including upper and lower pole pieces 11 and 12, provided with substantially flat parallel spaced-apart pole faces, and a tank 13 disposed between the pole faces of the pole pieces 11 and 12. The pole pieces 11 and 12 carry windings, not shown, which are adapted to be energized in order to produce a substantially homogeneous and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer side walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus 13a is associated with the tank 13, whereby the interior of the tank 13 may be evacuated to a pressure of the order of $10^{-5}$ to $10^{-4}$ mm. Hg. Preferably, the component parts of the tank 13 are formed of steel, the top and bottom walls 14 and 15 thereof being spaced a short distance from the pole faces of the upper and lower pole pieces 11 and 12 respectively, the tank 13 being retained in such position in any suitable manner, whereby the top and bottom walls 14 and 15 constitute in effect pole pieces with respect to the interior of the tank 13, as explained more fully hereinafter.

The removable end wall 18 suitably supports a source unit 20 comprising a charge receptacle 21 and a communicating arc-block 22. An electric heater 23 is arranged in heat exchange relation with the charge receptacle 21 and is adapted to be connected to a suitable source of heater supply, whereby the charge receptacle 21 may be appropriately heated, the charge receptacle 21 being formed of steel or the like. The arc-block 22 is formed, at least partially, of carbon or graphite and is substantially C-shaped in plan, an upstanding slot 24 being formed in the wall thereof remote from the charge receptacle 21. Thus, the arc block 22 is of hollow construction, the cavity therein communicating with the interior of the charge receptacle 21.

Also, the removable end wall 18 carries a filamentary cathode 25 adapted to be connected to a suitable source of filament supply, the filamentary cathode 25 overhanging the upper end of the arc-block 22 and arranged in alignment with respect to the upper end of the cavity formed therein. The arc-block 22 carries an anode 26 disposed adjacent the lower end thereof and arranged in alignment with respect to the cavity formed therein. Also, the arc-block 22 carries a collimating electrode 27 disposed adjacent the upper end thereof and having an elongated collimating slot 28 formed therethrough and arranged in alignment with respect to the filamentary cathode 25 as well as the anode 26 and the cavity formed in the arc-block 22. Both the anode 26 and the collimating electrode 27 are electrically connected to the source unit 20, which in turn is grounded; likewise, the tank 13 is grounded. Also, the filamentary cathode 25 and the cooperating anode 26 are adapted to be connected to a suitable source of arc supply.

Further, the removable end wall 18 carries ion accelerating structure 29 formed of carbon or graphite and disposed in spaced-apart relation with respect to the wall of the arc-block 22 in which the slot 24 is formed. More specifically, a slit 30 is formed in the ion accelerating structure 29 and arranged in substantial alignment with respect to the slot 24 formed in the wall of the arc-block 22. A suitable source of accelerating electrode supply is adapted to be connected between the arc-block 22 and the ion accelerating structure 29, the positive and negative terminals of the supply mentioned being respectively connected to the arc-block 22 and to the ion accelerating structure 29. Further, the positive terminal of the accelerating electrode supply is grounded.

The removable end wall 19 suitably supports a collector block 31 formed of stainless steel or the like and provided with two laterally spaced-apart cavities or pockets 32 and 33 which respectively communicate with aligned slots 34 and 35 formed in the wall of the collector block 31 disposed remote from the removable end wall 19. It is noted that the pockets 32 and 33 are adapted to receive two constituent isotopes of an element which have been separated in the calutron 10, as explained more fully hereinafter. Further, the inner wall 16 suitably supports a tubular liner 36 formed of copper or the like, rectangular in vertical cross-section, disposed within the tank 13 and spaced from the walls 14, 15, 16 and 17. One end of the tubular liner 36 terminates adjacent the accelerating structure 29; and the other end of the tubular liner 36 terminates adjacent the collector block 31; the tubular liner 36 constituting an electrostatic shield for the high velocity ions traversing the curved paths between the slit 30 formed in the ion accelerating structure 29 and the slots 34 and 35 formed in the collector block 31, as explained more fully hereinafter. Finally, the tubular liner 36 is electrically connected to the ion accelerating structure 29 and to the collector block 31. Thus, it will be understood that the source unit 20 and the tank 13 are connected to the positive grounded terminal of the accelerating electrode supply; while the ion accelerating structure 29, the tubular liner 36 and the collector block 31 are connected to the negative ungrounded terminal of the accelerating electrode supply; the ion accelerating structure 29, the tubular liner 36 and the collector block 31 being electrically insulated from the component parts of the tank 13.

Considering now the general principle of operation of the calutron 10, a charge comprising a compound of the element to be treated is placed or produced in the charge receptacle 21, the compound of the element mentioned being one which may be readily vaporized. The end walls 18 and 19 are securely attached to the open ends of the tank 13, whereby the tank 13 is hermetically sealed. The various electrical connections are completed and operation of the vacuum pumping apparatus 13a associated with the tank 13 is initiated. When a pressure of the order of $10^{-5}$ to $10^{-4}$ mm. Hg is established within the tank 13, the electric circuits for the windings, not shown, associated with the pole pieces 11 and 12 are closed and adjusted, whereby a predetermined magnetic field is established therebetween traversing the tank 13. The electric circuit for the heater 23 is closed, whereby the charge in the charge receptacle 21 is heated and vaporized. The vapor fills the charge receptacle 21 and is conducted into the communicating cavity formed in the arc-block 22. The electric circuit for the filamentary cathode 25 is closed, whereby the filamentary cathode is heated and rendered electron emissive. Then the electric circuit between the filamentary cathode 25 and the anode 26 is closed, whereby an arc discharge is struck therebetween, electrons proceeding from the filamentary cathode 25 through the collimating slot 28 formed in the collimating electrode 27 to the anode 26. The collimating slot 28 formed in the collimating electrode 27 defines the cross-section of the stream of electrons proceeding into the arc-block 22, whereby the arc discharge has a ribbon-like configuration and breaks up the molecular form of the compound of the vapor to a considerable extent, producing positive ions of the element that is to be enriched with the selected one of its isotopes.

The electric circuit between the arc-block 22 and the ion accelerating structure 29 is completed, the ion accelerating structure 29 being at a high negative potential with respect to the arc-block 22, whereby the positive ions in the arc-block 22 are attracted by the ion accelerating structure 29 and accelerated through the voltage impressed therebetween. More particularly, the positive ions proceed from the cavity formed in the arc-block 22 through the slot 24 formed in the wall thereof, and across the space between the ion accelerating structure 29 and the adjacent wall of the arc-block 22, and thence through the slit 30 formed in the ion accelerating structure 29 into the interior of the tubular liner 36. The high-velocity positive ions form a vertical upstanding ribbon or beam proceeding from the cavity formed in the arc-block 22 through the slot 24 and the aligned slit 30 into the tubular liner 36.

As previously noted, the collector block 31, as well as the tubular liner 36, is electrically connected to the ion accelerating structure 29, whereby there is an electric-field-free path for the high-velocity positive ions disposed between the ion accelerating structure 29 and the collector block 31 within the tubular liner 36. The high-velocity positive ions entering the adjacent end of the liner 36 are deflected from their normal straight-line path and from a vertical plane passing through the slot 24 and the aligned slit 30, due to the effect of the relatively strong magnetic field maintained through the space within the tank 13 and the liner 36 through which the positive ions travel, whereby the positive ions describe arcs, the radii of which are proportional to the square roots of the masses of the ions and consequently of the isotopes of the element mentioned. Thus, ions of the relatively light isotope of the element describe an interior arc of relatively short radius and are focused through the slot 34 into the pocket 32 formed in the collector block 31; whereas ions of the relatively heavy isotope of the element describe an exterior arc of relatively long radius and are focused through the slot 35 into the pocket 33 formed in the collector block 31. Accordingly, the ions of the relatively light isotope of the element are collected in the pocket 32 and are deionized to produce a deposit of the relatively light isotope of the element therein; while the ions of the relatively heavy isotope of the element are collected in the pocket 33 and are de-ionized to produce a deposit of the relatively heavy isotope of the element therein.

After all of the charge in the charge receptacle 21 has been vaporized, all of the electric circuits are interrupted and the end wall 18 is removed so that another charge may be placed or produced in the charge receptacle 21 and subsequently vaporized in the manner explained above. After a suitable number of charges have been vaporized in order to obtain appropriate deposits of the isotopes of the element in the pockets 32 and 33 of the collector block 31, the end wall 19 may be removed and the deposits of the collected isotopes in the pockets 32 and 33 in the collector block 31 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection reference is again made to the copending application of Ernest O. Lawrence, for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge to be placed or produced in the charge receptacle 21 is $UCl_4$, as this compound may be readily vaporized and the molecular form of the vapor may be readily broken up to form positive ions of uranium with great facility. In this case, uranium enriched with $U^{235}$ is collected in the pocket 32 of the collector block 31, and uranium comprising principally $U^{238}$ is collected in the pocket 33 of the collector block 31. Also, it is noted that from a practical standpoint, the deposit of uranium collected in the pocket 32 of the collector block 31 contains considerable amounts of $U^{238}$, in view of the fact that this isotope comprises the dominant constituent of normal uranium. Furthermore, the deposit of uranium collected in the pocket 32 of the collector block 31 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 32 of the collector block 31 is considerably enriched, both with $U^{234}$ and with $U^{235}$, and considerably impoverished with respect to $U^{238}$ as compared to natural or normal uranium.

Referring now more particularly to Figs. 3 to 5, inclusive, of the drawings, there are illustrated the structural details of the source unit 20 which is arranged in the magnetic field between the pole pieces of the calutron in the manner previously explained, the source unit 20 comprising the charge receptacle 21 and the arc-block 22. The charge receptacle 21 comprises wall structure, including a removable cover 50, defining an upstanding cylindrical cavity or reservoir 51 therein, that is adapted to receive a removable cylindrical charge bottle 52 embodying the features of the present invention and containing a charge 53 which is to be vaporized. The arc-block 22 comprises wall structure defining an upstanding distributing chamber 54 and an upstanding arc chamber 55 therein, the cavity 51 communicating with the distributing chamber 54 through a tubular member 56 supported by the wall structure of the charge receptacle 21 and the wall structure of the arc-block 22. The wall structure of the charge receptacle 21 carries the exteriorly arranged electric heater 23 of any suitable form, whereby the charge receptacle 21 and consequently the charge bottle 52 may be appropriately heated in order to vaporize the charge 53 contained in the charge bottle 52. Similarly, the wall structure of the arc-block 22 carries an exteriorly arranged electric heater 57 of any suitable form, whereby the arc-block 22, and more particularly the distributing chamber 54 therein, may be heated in order to prevent condensation of the contained vapor, as explained more fully hereinafter.

More particularly, the wall structure of the arc-block 22 comprises a substantially inverted U-shaped frame member 58, supporting an upstanding baffle plate 59, the frame member 58 and the baffle plate 59 being formed of carbon or graphite. The frame member 58 is secured to the wall structure of the arc-block 22 by an arrangement comprising two upstanding strips 60, and comprises a top wall 61, two upstanding substantially parallel spaced-apart side walls 62 and a front wall 63, the front wall 63 having the centrally disposed longitudinal slot 24 formed therein and communicating with the arc chamber 55. The side edges of the baffle plate 59 are spaced a short distance from the side wall 62 of the frame member 58 in order to provide communication between the distributing chamber 54 and the arc chamber 55, the baffle plate 59 defining the boundary between the chambers mentioned.

The wall structure of the charge receptacle 21 carries a standard 64 which supports cathode structure 65 in cooperating relationship with respect to the arc-block 22. More particularly, the cathode structure 65 comprises two terminals 66 supporting the opposite ends of the substantially U-shaped filamentary cathode 25, the opposite ends of the filamentary cathode 25 being removably clamped in place by the respective terminals 66, and the two terminals being connected to the suitable source of filament supply, as previously noted. The central portion of the filamentary cathode 25 overhangs the central portion of the top wall 61 of the frame member 58, the top wall 61 having a transversely extending slot 67 formed therethrough communicating with the arc chamber 55. The upper end of the transverse slot 67 is provided with a counter recess 68 extending thereabout which receives the collimating electrode 27, the collimating electrode 27 having the transversely extending slot 28 formed therethrough, as previously noted, and communicating with the transverse slot 67 formed in the top wall 61 and consequently with the arc chamber 55. More particularly, the filamentary cathode 25 is spaced a short distance above the collimating electrode 27, the central portion of the filamentary cathode 25 being arranged in alignment with the transverse slot 28 formed in the collimating electrode 27. Further, a laterally extending slot 69 is formed in the front wall 63 of the frame member 58 adjacent the lower end thereof, and supports the anode 26 extending into the arc chamber 55 in alignment with the central portion of the filamentary cathode 25 and the transverse slot 28 formed in the collimating electrode 27.

The negative and positive terminals of the arc supply are respectively connected to the filamentary cathode 25 and to the arc-block 22, the anode 26 and the collimating electrode 27 being connected together by the frame member 58, and consequently by way of the arc-block 22 to the positive terminal of the arc supply mentioned, as previously noted. Finally, a shield 70 is supported by one of the terminals 66 and extends laterally over the upper surface of the central portion of the filamentary cathode 25 in order to prevent migration of the electrons emitted by the filamentary cathode 25 upwardly in the longitudinal direction.

Considering now the detailed operation of the source unit 20, when the electric circuit for the heater 23 is completed, the charge receptacle 21 and consequently the charge bottle 52 are heated, whereby the charge 53 is vaporized, filling the cavity 51 in the charge receptacle 21. The vapor passes through the tubular member 56 into the distributing chamber 54, whereby this chamber is filled with the vapor. The vapor is thoroughly mixed in the distributing chamber 54 and passes around the side edges of the baffle plate 59 into the arc chamber 55, whereby this chamber is filled with the vapor. More particularly, the arc chamber 55 is thoroughly and uniformly filled with the vapor to be ionized, due to the arrangement of the distributing chamber 54 and the baffle plate 59.

When the circuit for the filamentary cathode 25 is completed, the filamentary cathode 25 is heated and rendered electron emissive; and when the arc supply circuit is completed between the filamentary cathode 25 and the arc-block 22, electrons are projected from the central portion of the filamentary cathode 25 toward the collimating electrode 27. More particularly, some of these electrons pass through the transverse slot 28 formed in the collimating electrode 27 into the arc chamber 55 and proceed toward the anode 26. Accordingly, the collimating electrode 27 causes a stream of electrons having a ribbon-like configuration to be projected through the arc chamber 55, whereby the vapor in the arc chamber 55 is ionized. The positive ions produced in the arc chamber 55 are drawn through the upstanding slot 24 formed in the front wall 63 of the frame member 58 by the associated ion accelerating structure 29, whereby the beam of positive ions having a substantially ribbon-like configuration is projected into the adjacent end of the associated liner 36 and directed toward the cooperating collector block 31.

Referring now to Fig. 3, 5 and 6 of the drawings, the charge bottle 52 as illustrated constitutes a receptacle and comprises a body including a relatively thick bottom wall 80, a relatively thick top wall 81, and an upstanding cylindrical side wall 82, all formed of a good heat conducting material such, for example, as stainless steel, and secured together. A centrally disposed annular opening or aperture 83 is formed in the top wall 81 in order to provide a communication between the interior of the charge bottle 52 and the cavity 51 formed in the charge receptacle 21, as clearly indicated in Figs. 3 and 5. More particularly, the top wall 81 may be welded within the upper end of cylindrical side wall 82; whereas the bottom wall 80 is removably secured in place in the lower end of the cylindrical side wall 82 by an arrangement including a ring 84 secured within the cylindrical side wall 82 just above the extreme lower end thereof and a plurality of screws 85.

Also, the charge receptacle 21 includes a removable bottom wall 86 which is normally secured in place by an arrangement including a plurality of screws 87; which bottom wall 86 has an opening 88 formed therein and arranged in alignment with an opening 89 formed in the bottom wall 80 of the charge bottle 52. Also, the bottom wall 86 of the charge receptacle 21 carries a fixture 90 hermetically sealed thereto about the opening 88 by an arrangement including a plurality of screws 91; into which fixture 90 there is threaded in hermetically sealed relationship a pipe 92. Arranged in the upper end of the pipe 92 is a tube 93 which projects through the openings 88 and 89, respectively, formed in the bottom walls 86 and 80 of the charge receptacle 21 and the charge bottle 52, the upper end of the tube 93 terminating within the lower portion of the charge bottle 52. A substantially conical shaped cap or hood 94 having a plurality of slots 95 formed therein is disposed in the lower portion of the charge bottle 52 and positioned over the upper end of the tube 93, the hood 94 being secured directly to the bottom wall 80 of the charge bottle 52 by an arrangement including a plurality of spaced-apart legs 96 welded both to the bottom wall 80 and to the hood 94. This arrangement permits gas conducted through the pipe 92 and the communicating tube 93 to be introduced into the lower portion of the charge bottle 52 and directly into the charge material 53 without interference for a purpose more fully explained hereinafter.

The lower end of the pipe 92 is suitably connected to a pipe 97 which extends through an opening formed in the removable end wall 18 carried by the tank 13; into which opening there is arranged a suitable sealing gland 98 in order to prevent the leakage of air from the exterior into the tank 13 around the pipe 97. The extreme outer end of the pipe 97 is connected to a manifold 99 which in turn is connected to a pipe 100. The pipe 100 is connected to a suitable source of gas 101 under pressure by an arrangement including a throttling valve 102; which throttling valve 102 may be suitably adjusted in order to control the supply of gas under pressure through the pipe 100 into the lower portion of the charge bottle 52 and into the surrounding charge 53 contained therein.

Considering now this arrangement from an operative standpoint, it is pointed out that the charge material $UCl_4$ is desired so that it may be vaporized and utilized in the source unit 20 in the manner previously explained; which charge material $UCl_4$ is produced in situ by the reaction of a suitable uranium-containing compound with gaseous chlorine. By way of illustration, it has been found that either of the compounds $UCl_3$ or uranium carbide, as well as finely divided uranium metal freshly reduced from uranium hydride, may be employed as material which may be readily converted in situ into $UCl_4$ by contact with chlorine gas.

Most specifically, one of the materials mentioned is initially placed in the lower portion of the charge bottle 52 incident to the assembly of the ion source unit 20 and the arrangement of the removable end wall 18 upon the tank 13, in the manner previously explained. Thereafter, the piping connections between the tube 93 and the pipe 100 are completed and the tank 13 of the calutron 10 is pumped down to a relatively low pressure, all in the manner previously explained. At this time, when the heater 23 is energized, the material placed in the lower portion of the charge bottle 52 is heated to a suitable reaction temperature in the neighborhood of 500° C.; and then the throttling valve 102 is adjusted in order to permit chlorine gas under pressure from the source 101 to be throttled into the pipe 100 and consequently into the manifold 99, whereby it is introduced through the tube 93 into the lower portion of the charge bottle 52 in order to bring about the reaction of the original material placed therein, and the consequent production of $UCl_4$ which is immediately sublimed or vaporized as it is produced and conducted from the upper portion of the charge bottle 52 into the cavity or reservoir 51 in the charge receptacle 21 and thence into the distribution chamber 54 and ultimately into the arc chamber 55 wherein it is ionized, all in the manner previously explained.

In passing, it is noted that with the usual adjustment of the throttling valve 102 in order to produce in situ $UCl_4$ for calutron operation, a slight excess of chlorine gas is supplied, which excess chlorine gas along with the sublimed or vaporized $UCl_4$ produced is conducted from the upper portion of the charge bottle 52 into the arc chamber 55. However, it has been found that in fact this excess chlorine gas, present with the $UCl_4$ vapor, is beneficial in the production of positive uranium ions.

In view of the foregoing description of the production in situ of $UCl_4$ in the charge bottle 52, it will be understood that the rate of production of the $UCl_4$ may be readily controlled merely by adjusting the throttling valve 102, which arrangement provides for a very convenient control of the amount of $UCl_4$ which is supplied to the arc chamber to be ionized. Hence, it will be understood that the rate of production of positive ions in the arc chamber 55 is determined by the rate at which the charge material $UCl_4$ is supplied thereto; which last-mentioned rate is, as previously noted, controlled by the rate at which chlorine gas is supplied through the tube 93 into the lower portion of the charge bottle 52 which is controlled by adjustment of the throttling valve 102.

What is claimed is:

1. In combination with a calutron comprising a closed tank permeated by a magnetic field and housing an ion source unit including structure providing a charge reservoir containing a uranium containing substance capable of forming $UCl_4$ when contacted with free $Cl_2$, heating means associated with said charge reservoir and a communicating charge ionizing chamber, means for introducing free $Cl_2$ into said charge reservoir and into contact with said uranium containing substance, whereby $UCl_4$ is formed and simultaneously vaporized in said charge reservoir filling said charge reservoir and entering said communicating charge ionizing chamber.

2. In combination with a calutron comprising a closed tank permeated by a magnetic field and housing an ion source unit including structure providing a charge reservoir containing a uranium containing substance capable of forming $UCl_4$ when contacted with free $Cl_2$, heating means associated with said charge reservoir and a communicating charge ionizing chamber, means for introducing a regulated flow of free $Cl_2$ into said charge reservoir and into contact with said uranium containing substance, whereby $UCl_4$ is formed and simultaneously vaporized in said charge reservoir filling said charge reservoir and entering said communicating charge ionizing chamber.

3. In combination with a calutron comprising a closed tank permeated by a magnetic field and housing an ion source unit including structure providing a charge reservoir containing a uranium containing substance capable of forming $UCl_4$ when contacted with a gaseous chlorinating agent, heating means associated with said charge reservoir and a communicating charge ionizing chamber, means for introducing a gaseous chlorinating agent into said charge reservoir and into contact with said uranium containing substance, whereby $UCl_4$ is formed and simultaneously vaporized in said charge reservoir filling said charge reservoir and entering said communicating charge ionizing chamber.

4. In combination with a calutron comprising a closed tank permeated by a magnetic field and housing an ion source unit including structure providing a charge reservoir containing a uranium containing substance capable of forming $UCl_4$ when contacted with free $Cl_2$, heating means associated with said charge reservoir and a communicating charge ionizing chamber, a fixture disposed in the lower portion of said charge reservoir and provided with a hood extending over the bottom of said charge reservoir, a conduit opening below said hood and extending through the bottom of said charge reservoir to an outside source of $Cl_2$, and throttling means disposed in said conduit between said charge reservoir and said outside source of $Cl_2$ in order that free $Cl_2$ may be introduced into said charge reservoir and into contact with said uranium containing substance, whereby $UCl_4$ is formed and simultaneously vaporized in said charge reservoir filling said charge reservoir and entering said communicating charge ionizing chamber.

5. A calutron process comprising introducing chlorine gas into a calutron at a regulated rate to react with a heated uranium containing charge material disposed therein to yield uranium tetrachloride vapor at a corresponding regulated rate, producing ions of such uranium tetrachloride vapor, accelerating said ions in quantities to produce space charges of ion beam disruptive amounts, and producing an ambient atmosphere of from $10^{-4}$ to $10^{-5}$ mm. Hg for said accelerated ions.

6. The process as defined in claim 5 wherein said uranium containing charge material is a material selected from the group consisting of finely divided uranium metal, uranium trichloride and uranium carbide.

7. The process as defined in claim 5 wherein said uranium containing charge material is heated to a temperature of about 500° C. and said uranium containing charge material is a material selected from the group consisting of finely divided uranium metal, uranium trichloride and uranium carbide.

8. A calutron process comprising introducing a charge material selected from the group consisting of finely divided uranium metal, uranium trichloride and uranium carbide into the charge receptacle of the calutron ion source unit, sealing the calutron ion source unit, heating said charge receptacle to about 500° C., introducing chlorine gas into said charge receptacle at a throttled rate to react with said charge material so as to yield uranium tetrachloride vapor at a corresponding regulated rate, producing ions of such uranium tetrachloride vapor, accelerating said ions in quantities to produce space charges of ion beam disruptive amounts, and providing an ambient atmosphere of from $10^{-4}$ to $10^{-5}$ mm. Hg for said accelerated ions.

9. In a calutron process wherein ions are produced of vaporized uranium tetrachloride and such ions are accelerated in quantities to produce space charges of ion beam disruptive amounts while there is provided an ambient atmosphere of from $10^{-4}$ to $10^{-5}$ mm. Hg for said accelerated ions, the improvement comprising controlling the amount of uranium tetrachloride vapor treated in said calutron by introducing chlorine gas at a regulated rate to react with a heated uranium containing charge material disposed therein to yield said vaporized uranium tetrachloride at a corresponding regulated rate.

10. A calutron process comprising introducing chlorine gas into a calutron at a regulated rate to react with a heated metallic element containing charge material disposed therein to yield vapor of said element at a correspondingly regulated rate, producing ions of such elemental vapor, accelerating said ions in quantities to produce space charges of ion beam disruptive amounts, and producing an ambient atmosphere of from $10^{-4}$ to $10^{-5}$ mm. Hg for said accelerated ions.

References Cited in the file of this patent

UNITED STATES PATENTS

| 2,221,467 | Bleakney | Nov. 12, 1940 |
| 2,758,006 | Carter et al. | Aug. 7, 1956 |

OTHER REFERENCES

Comptes Rendus, vol. 122, page 1088 (1896).
Friend: Textbook of Inorganic Chemistry, vol. VII, part III, page 294. Griffin & Co. Ltd., London.